United States Patent [19]

Whanger et al.

[11] Patent Number: 4,539,018
[45] Date of Patent: Sep. 3, 1985

[54] METHOD OF MANUFACTURING CUTTER ELEMENTS FOR DRILL BITS

[75] Inventors: James R. Whanger; Ralph Staudenmayer, both of Houston, Tex.

[73] Assignee: Hughes Tool Company—USA, Houston, Tex.

[21] Appl. No.: 608,047

[22] Filed: May 7, 1984

[51] Int. Cl.³ ............................................... B24B 1/00
[52] U.S. Cl. ......................................... 51/295; 51/309
[58] Field of Search ................................... 51/295, 309

[56] References Cited

U.S. PATENT DOCUMENTS

| | | | |
|---|---|---|---|
| 2,200,281 | 5/1940 | Koebel | 76/106 |
| 3,233,988 | 2/1966 | Wnetorf, Jr. et al. | 51/307 |
| 3,609,818 | 10/1971 | Wentorf, Jr. | 425/77 |
| 3,743,489 | 7/1923 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 3,894,673 | 7/1975 | Lowder et al. | 228/122 |
| 4,006,788 | 2/1977 | Garner | 175/330 |
| 4,063,909 | 12/1977 | Mitchell | 51/295 |
| 4,140,189 | 2/1979 | Garner | 175/329 |
| 4,151,889 | 5/1979 | Lister | 175/410 |
| 4,156,329 | 5/1979 | Daniels et al. | 51/295 |
| 4,199,035 | 4/1980 | Thompson | 175/410 |
| 4,221,270 | 9/1980 | Vezirian | 175/329 |
| 4,225,322 | 9/1980 | Knemeyer | 51/295 |
| 4,319,707 | 3/1982 | Knemeyer | 228/46 |
| 4,325,439 | 4/1982 | Vezirian | 175/329 |

Primary Examiner—Paul Lieberman
Assistant Examiner—Willie Thompson
Attorney, Agent, or Firm—Robert A. Felsman; Charles D. Gunter, Jr.

[57] ABSTRACT

A method is shown for fabricating cutter elements for a drill bit, each of the cutter elements being mounted on the drill bit by a mounting stud. A plurality of composite compacts are provided, each of the compacts having an exposed abrasive diamond surface bonded to a carbide substrate portion. The exposed diamond surface is coated with a thin, metal layer, which is relatively easier to grind away in subsequent steps than the diamond surface itself. The coated surface of the compact is then ground to a depth slightly less than the depth of the diamond surface to thereby form a smoothly ground surface for the compact. The smoothly ground surface of the compact is then contacted with a heat sink while the composite compact is brazed to the mounting stud. Each mounting stud so prepared is then affixed to a suitable receiving area provided on the drill bit.

8 Claims, 7 Drawing Figures

METHOD OF MANUFACTURING CUTTER ELEMENTS FOR DRILL BITS

BACKGROUND OF THE INVENTION

1. Field of the Invention

This invention relates to a method for manufacturing a cutter element for a drill bit of the type used to drill earthen formations and, specifically, to a method for bonding a composite compact to the mounting stud which is used to mount the compact as a cutter element in a drill bit.

2. Description of the Prior Art

In the past, conventional rotary drill bits for drilling oil and gas wells have used cutting elements including steel teeth, steel teeth coated with tungsten carbide, compact inserts of cemented tungsten carbide, and natural diamonds set or molded in tungsten carbide. In more recent years, synthetic diamond compacts have been utilized as the cutting elements in drill bits.

Certain of the prior designs have utilized drill bit cutting elements which were formed by attaching a diamond composite compact having a cemented carbide substrate to a cemented carbide stud by brazing the composite compact to the stud. The stud was then mounted in any of a number of ways to the drill bit, as by mounting the stud in a hole provided in the drill bit exterior surface.

The term "composite compact" is understood by those skilled in the art to means a cluster compact which is bonded to a substrate material such as cemented tungsten carbide. The term "cluster compact" is generally understood to mean a cluster of abrasive particles such as synthetic diamonds or cubic boron nitride. The abrasive particles are bonded together either in a self-bonded relationship or by means of a suitable bonding medium disposed between the crystals, or by a combination of these means. The methods for making cluster compacts of the type under consideration are described, for instance, in U.S. Pat. No. 3,136,615, U.S. Pat. No. 3,233,988 and U.S. Pat. No. 3,609,818.

The method of bonding the cluster compact to the substrate to form the composite compact utilized in the invention is known to those skilled in the art. The bond can be formed either during or subsequent to the formation of the cluster compact. For a better understanding of the techniques utilized in forming the bond, the reader is referred to U.S. Pat. No. 3,743,489, U.S. Pat. No. 3,745,623 and U.S. Pat. No. 3,767,371.

It is customary in the industry to provide an elongated base or stud for supporting the commercially supplied composite compact in mounting the compact on the drill bit. While it is technically feasible to form an integral composite compact of adequate length, the commercially adapted method is to braze an additional length of cemented carbide to the carbide base of the composite compact, because of significant cost savings in the latter method.

The present invention is directed to that step in the manufacturing process involving the attachment of commercially supplied composite compact to the cemented carbide stud which, in turn, is used to mount the composite compact as a cutter element in a drill bit.

In the past, brazing techniques for attaching the composite compact to the mounting stud were limited because the diamond layer of the composite compact is thermally degraded at temperatures above about 700° C. Cubic boron nitride composite compacts are also thermally degraded at temperatures above about 700° C. As a result, a brazing filler was generally required which had a liquidus below 700° C. However, such brazing fillers have been found to generally form braze joints of lower strength than braze fillers having higher liquidus temperatures.

In U.S. Pat. No. 4,319,707 to Knemeyer, issued Mar. 16, 1982, a method and apparatus for brazing a composite compact to a mounting stud are shown in which the stud substrate is bonded to the base layer of the composite compact with a filler metal which, to form a bond, requires the exposure of the surface to be bonded to a temperature greater than the degradation temperature of the diamond layer. The apparatus shown heats the base layer, filler metal and substrate to a temperature in excess of the degradation temperature of the diamond layer while maintaining the temperature of the diamond layer below the degradation temperature with a heat sink. The heat sink of the apparatus features a cooling head or punch which contacts the diamond surface of the composite compact during the brazing step to keep the temperature of the diamond layer below the temperature at which it would thermally degrade.

Since the diamond surface of the composite compact is rough, as produced, it must be ground smooth in order to obtain maximum contact with the cooling head during the subsequent brazing operation. In the past, it was necessary to utilize a diamond grinder in order to grind or lap the exposed diamond surface of the composite compact. Since diamonds are required to cut or grind diamonds, this step added to the time and expense in the manufacturing process.

The present invention has as its object a method for reducing the manufacturing expense associated with providing a smoothly ground surface on the diamond end of the composite compact.

The invention also has as its object a method of providing a smoothly ground surface on a diamond composite compact without the necessity of utilizing a diamond grinding or lapping tool.

SUMMARY OF THE INVENTION

In the method of the invention, a composite compact is bonded to a mounting stud of the type used to mount the compact as a cutter element in a drill bit. The composite compact is obtained commercially and has an abrasive particulate portion having an exposed abrasive surface bonded to a substrate portion. In the method of the invention, the exposed, abrasive surface of the composite compact is coated with a thin, metal layer. The abrasive surface so coated is then ground to form a smoothly ground surface. During the step of brazing the composite compact to the mounting stud, the smoothly ground surface of the composite is contacted with a cooling head to keep the temperature of the abrasive particulate portion of the compact below the point of thermal degradation.

The exposed, abrasive surface of the composite compact can be coated with any metal which will bond to the compact, and which is relatively easier to grind away than the abrasive surface. The relatively softer material can then be ground to a depth less than the depth of the particulate surface to provide a smooth surface on the composite compact for contact with the cooling head.

Additional objects, features and advantages will be apparent in the written description which follows.

DETAILED DESCRIPTION OF THE INVENTION

Figure 1:
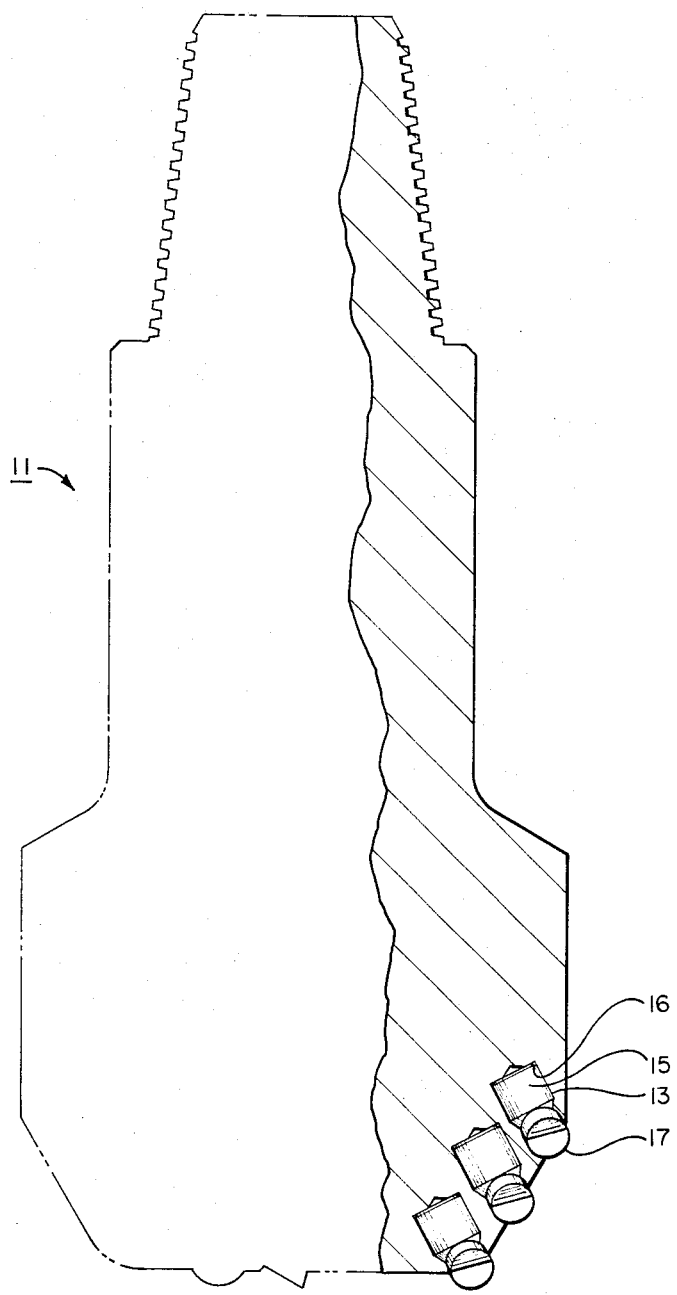
FIG. 1 is a side view of a drill bit, partly broken away and in section showing cutter elements of the invention in perspective, mounted within the drill bit.

FIG. 1 shows a drill bit 11 with cutter elements, designated generally as 13. Each of the cutter elements 13 includes a mounting stud 15 to which is bonded a composite compact 17. The mounting stud 15 is retained within an opening 16 provided in the bit head, as by press-fitting or brazing the stud within the opening.

Figure 2:
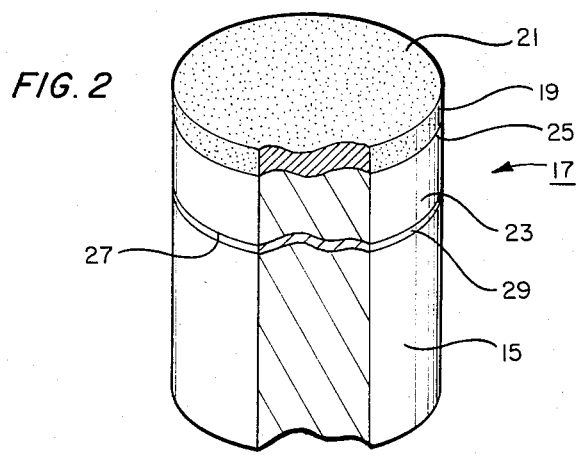
FIG. 2 is a perspective view, partly broken away and in section of a composite compact bonded to a mounting stud.

Each finished composite compact 17, as shown in FIG. 2, includes a thin, planar layer or mass 19 of bonded abrasive particles of either diamond or hard phase boron nitride having an abrasive surface 21. The abrasive mass 19 is bonded to a substrate 23 of cemented carbide along an interface 25. The carbide substrate 23 also has an exposed end surface 27 opposite the abrasive surface 21.

The preferred compacts 17 are commercially available and are described in U.S. Pat. No. 3,745,623. Layer 19 is comprised by volume of at least 70% diamond and preferably in excess of 90% diamond. The remaining composition is comprised of bonding material, such as cobalt or alloys which have infiltrated into layer 19 during the fabrication process of the compact. It will be understood that other hard abrasive particles, such as cubic or hexagonal hard phase boron nitride, can be utilized as the layer 19. A process of making such hard phase boron nitride is shown in U.S. Pat. No. 3,743,489 and U.S. Pat. No. 3,767,371.

The substrate 23 is preferably of cemented carbide. See U.S. Pat. No. 3,745,623, for a description of suitable cemented carbides. The cemented carbides are preferred because of their hardness, although ceramics such as alumina or steel can be utilized in some applications. The mounting stud 15 is also preferably of cemented carbide, identical to the material of substrate 23.

The filler metal 29 is preferably a high temperature, high strength brazing filler having a liquidus greater than the degradation temperature of the abrasive particulate mass 19. Acceptable filler metals can be chosen from the group of alloys compatible with the materials being brazed. A preferred braze filler commercially available is Anaconda 773.

Figure 3:
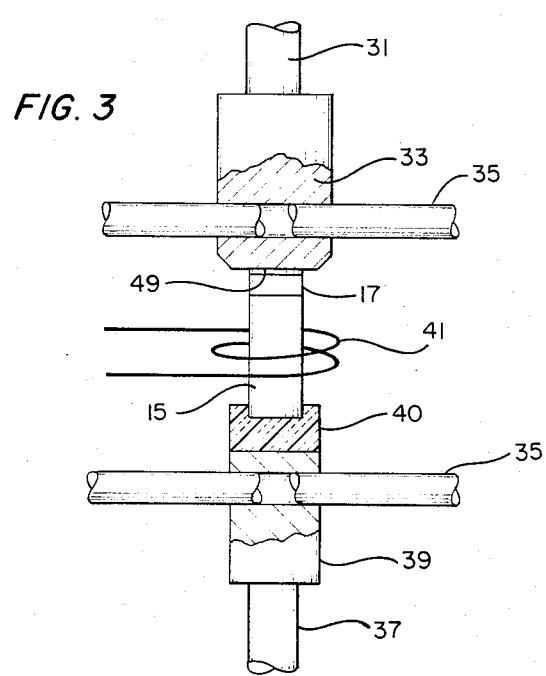
FIG. 3 is a simplified, side view of the apparatus used in the brazing step of the method of the invention.

FIG. 3 shows the parts of an apparatus used for fabricating cutter elements which are relevant to the present invention. The apparatus is described in greater detail in U.S. Pat. No. 4,319,707 to Knemeyer, issued Mar. 16, 1982, the disclosure of which is hereby incorporated by reference. The apparatus includes a plunger 31 with a suitably shaped end surface 49 for making contact with one end of the composite compact 17. Head 33 is provided with a coolant, such as water, circulated through tube 35 from a coolant supply. Head 33 and coolant supply tube 35 form a heat sink for diamond layer 19 during the step of brazing the compact 17 to the mounting stud 15.

The apparatus of FIG. 3 also includes a cylinder plunger 37 with a head 39 affixed thereto. Head 39 has a ceramic insulator 40 positioned thereon to prevent the heat sinking of stud 15 to head 39 during brazing. Head 39 is also interconnected to the coolant supply in tube 35. An induction heating coil assembly 41 surrounds the mounting stud 15 and compact 17 for providing the heat necessary to braze the materials.

In the brazing operation, a shim or powder mixture of brazing filler 29 (FIG. 2) is positioned between the composite compact end 27 and the top surface mounting stud 15 as stud 15 and compact 27 are positioned between the plungers 31, 37. The filler 29 is then heated to a temperature above the melting point to melt the filler and firmly bond the compact 17 to the mounting stud 15. The plungers are then retracted and the finished cutter element is removed from the apparatus.

Figure 4:
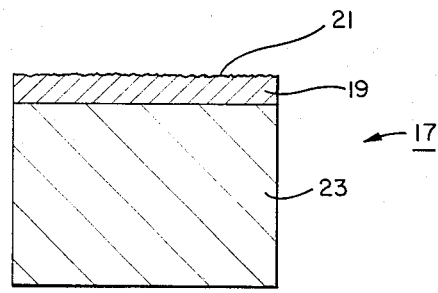
FIG. 4 is a simplified, microscopic, cross-sectional view of a composite compact of the invention in the rough state.
Figure 7:
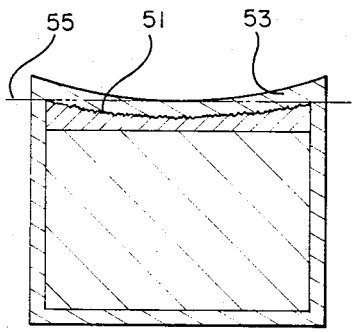
FIG. 7 is a view similar to FIG. 5 showing a dished-out upper surface of a coated composite compact prior to grinding.

As shown in FIG. 4, the commercially supplied composite compacts 17 have a rough abrasive surface 21. Although the abrasive surface 21 is shown as being flat in FIG. 4, the surface can also be concave, as shown in FIG. 7, or even convex. As has been described, it is only by contacting the abrasive diamond surface 21 with the cooling head 33 that the temperature of the diamond layer is kept below the thermal degradation point while the brazing is carried out.

In order that the cooling head 33 might effectively dissipate the heat from the top surface 21 of the compact 17, the surface 21 must be ground perfectly smooth. In the past, this was accomplished by grinding the exposed abrasive surface (21 in FIG. 4) with a diamond grinder or lapping device. This approach to the problem added to the manufacturing cost since diamond surfaces can only be ground smooth by a grinding tool utilizing diamonds as the grinding medium.

Figure 5:
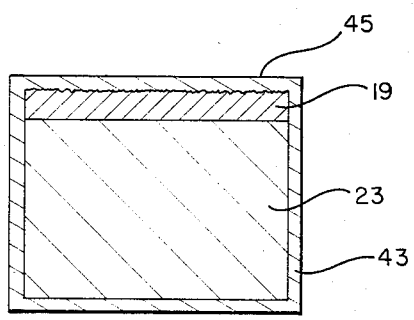
FIG. 5 is a microscopic, cross-sectional view similar to FIG. 2, but showing the thin, metal coating of the invention.

In the method of the present invention, the composite compact 17, as commercially supplied, is first coated with a thin metal layer (43 in FIG. 5). The metal selected for coating the composite compact 17 can generally be any metal capable of bonding to the composite compact which is relatively softer to grind than the abrasive surface 21. Generally, any metal selected from the group consisting of Group I-B, II-B, IV-B, V-B, VI-B, VII-B and VIII, elements of the periodic table of chemical elements and alloys thereof can be used. Preferably, copper is used as a conveniently available, economical coating material.

The process used to coat the composite compact 17 with the thin metal layer is not critical and any known technique such as electrodeless coating or plating, chemical vapor coating and plasma deposition can be used. It is only necessary that the abrasive surface 21 be coated to a depth sufficient to cover the diamond layer 19, although convenience may dictate that the entire composite compact 17 be coated by a thin metal layer. The depth of the film or coating over the abrasive surface 21 is preferably at least about 0.003 inches thick.

Once the composite compact 17 is coated with a metal layer, such as electrolodeless applied copper, a protective layer is formed which covers any protruding diamonds in the abrasive surface 21. The coated diamond surface (45 in FIG. 5) can then be ground to a depth sufficient to form a smooth even surface over the diamond layer 19 by using conventional grinding tools which do not utilize diamond grinder elements. The depth to which the coated surface 45 is ground is not critical, as long as the depth is less than the depth of the abrasive diamond surface 21 in the diamond layer 19. The coated surface 45 which is left after grinding is illustrated in simplified fashion in FIG. 6. Although the thin metal layer 43 is left in its original thickness around the remainder of the composite compact, it should be understood that the coating could have been applied only to the diamond layer, such as by sputtering, if desired.

Figure 6:
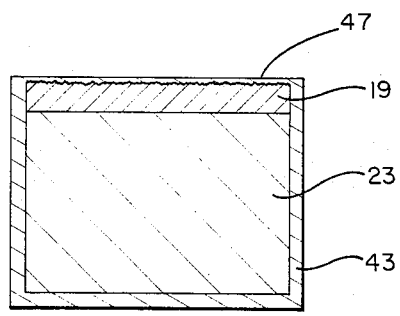
FIG. 6 is a view similar to FIG. 3, showing a flat, exposed surface of the diamond layer after grinding.

The composite compact 17, as shown in FIG. 6, with a smoothly ground top surface 47, is now placed in the apparatus of FIG. 3 and the cooling head 33 is lowered into contact with the top surface 47. Because the end surface 49 of the cooling head makes contact over the entire exposed top surface of the coated and ground composite compact 17, the diamond layer is cooled during the subsequent brazing operation and is not thermally degraded.

Although the composite compacts 17 have been shown with relatively flat but rough upper surfaces in FIG.'s 4–6, FIG. 7 illustrates another aspect of the problem toward which the present invention is directed. As shown in somewhat exaggerated fashion in FIG. 7, the compacts can be supplied with a dished-out upper surface 51 when viewed in cross section. If the surface 51 were left unground, the cooling head 33 would only make contact with a ring-shaped area around the periphery of surface 51 during the brazing step.

Using the method of the present invention, the compact abrasive surface 51 is coated with a thin metal layer 53. The coated surface can then be ground to the level indicated by line 55 in FIG. 7 to provide a smooth surface for contacting the cooling head 33 during brazing.

An alternate method of grinding compacts having concave or convex diamond coated surfaces is to use a technique which will retain the curvature of the upper surface. In order to make even contact, the end surface 49 of the cooling head 33 would be concave or convex to match the smoothly ground coated surface of the compact. In such cases, the ground, coated surface would look more like layer 53 in FIG. 7.

An invention has been provided with several advantages. By using commonly available metal coating techniques, a smoothly ground, top surface can be provided for the composite compact which is desirable in subsequent manufacturing operations. The smoothly ground surface can be provided by grinding the coated surface to an appropriate depth, utilizing grinding devices which do not require diamond grinding elements. Because the coated metallic layer is softer than the abrasive surface of the composite compact, the grinding operation is less time consuming and more economical.

While the invention has been shown in only one of its forms, it is not thus limited but is susceptible to various changes and modifications without departing from the spirit thereof.

I claim:

1. In a method of bonding a composite compact to a mounting stud of the type used to mount the compact as a cutter element in a drill bit where the composite compact has an abrasive portion having an exposed, abrasive surface which has previously been bonded to a substrate portion, the improvement comprising the steps of:
   coating the exposed, abrasive surface of said composite compact with a thin, metal layer;
   grinding said coated, abrasive surface of said composite compact to form a smoothly ground surface;
   providing a brazing filler between said compact substrate portion and said mounting stud; and
   contacting said smoothly ground surface of said composite compact with a heat sink while brazing said substrate portion of said composite compact to said mounting stud.

2. In a method of bonding a composite compact to a mounting stud of the type used to mount the compact as a cutter element in a drill bit where the composite compact has an exposed, abrasive diamond surface which has previously been bonded to a substrate portion, the improvement comprising the steps of:
   coating the exposed, diamond surface of said composite compact with a thin, metal layer, said metal being selected from the group consisting of I-B, II-B, IV-B, V-B, VI-B, VII-B, and VIII, elements of the periodic talble of chemical elements and alloys thereof;
   grinding said coated, diamond surface of said composite compact to form a smoothly ground surface;
   providing a brazing filler between said compact substrate portion and said mounting stud; and
   contacting said smoothly ground surface of said composite compact with a heat sink while brazing said substrate portion of said composite compact to said mounting stud.

3. In a method of bonding a composite compact to a mounting stud of the type used to mount the compact as a cutter element in a drill bit where the composite compact has an exposed, abrasive diamond surface which has previously been bonded to a substrate portion, the method comprising the steps of:
   coating the exposed, diamond surface of said composite compact with a thin, metal layer, said layer being selected from the group consisting of group I-B, II-B, IV-B, V-B, VI-B, VII-B, and VIII, elements of the periodic table of chemical elements and alloys thereof;
   grinding said coated, diamond surface of said composite compact to a depth sufficient to form a smoothly ground surface;
   providing a brazing filler between said compact substrate portion and said mounting stud; and
   contacting said smoothly ground surface of said composite compact with a heat sink while brazing said substrate portion of said composite compact to said mounting stud at a temperature above the thermal degradation temperature of said diamond surface.

4. The method of claim 3, wherein said metal layer is applied to said exposed, abrasive diamond surface to a depth sufficient to produce a protective layer covering any protruding diamonds in said diamond layer.

5. The method of claim 4, wherein said coating applied to said exposed abrasive diamond surface is at least about 0.003 inches thick.

6. The method of claim 5, wherein said method of coating said exposed diamond surface with a thin, metal layer is selected from the group consisting of elecrodeless, chemical vapor and plasma deposition coating methods.

7. The method of claim 6, wherein said coating is electrodeless applied copper.

8. A method of fabricating a drill bit having a plurality of cutter elements carried thereon, said cutter elements being mounted on said drill bit by mounting studs, comprising the steps of:

providing a plurality of composite compacts, each of said compacts having an exposed abrasive diamond surface which has previously been bonded to a carbide substrate portion;

coating the exposed, diamond surface of said composite compact with a thin, metal layer, said metal comprising any metal which will form a compatible coating with said composite compact and which is relatively easier to grind away than the diamond surface;

grinding the metal-coated surface of said composite compact to a depth slightly less than the depth of said abrasive diamond surface to form a smoothly ground surface for said compact;

providing a brazing filler between said compact substrate portion and said mounting stud; and contacting said smoothly ground surface of said compact with a heat sink while brazing said carbide substrate portion of said composite compact to said mounting stud; and affixing the mounting stud end of each such cutter element so prepared to a receiving area provided on said drill bit.

* * * * *